United States Patent [19]

Jannson et al.

[11] Patent Number: 5,293,272
[45] Date of Patent: Mar. 8, 1994

[54] HIGH FINESSE HOLOGRAPHIC FABRY-PEROT ETALON AND METHOD OF FABRICATING

[75] Inventors: Tomasz P. Jannson; Tin M. Aye, both of Torrance; Jay W. Hirsh, Los Angeles; Christopher C. Rich, San Pedro, all of Calif.

[73] Assignee: Physical Optics Corporation, Torrance, Calif.

[21] Appl. No.: 934,793

[22] Filed: Aug. 24, 1992

[51] Int. Cl.⁵ .................. G03H 1/00; G01B 9/021
[52] U.S. Cl. .................................. 359/1; 359/3; 359/30; 359/900; 356/347
[58] Field of Search ............ 359/1, 3, 22, 30, 900; 356/347

[56] References Cited

U.S. PATENT DOCUMENTS 4,790,634 12/1988 Miller et al. ................. 359/260

OTHER PUBLICATIONS

"Multiplexed Holographic Fabry-Perot Étalons", Lin et al., Applied Optics, vol. 31, No. 14, May 10, 1992 (pp. 2478-2484).
C. P. Kuo, T. Aye, D. G. Pelka, J. Jannson, and T. Jannson, "Tunable holographic Fabry-Perot étalon fabricated from poor quality-glass substrates," Optics Letters, vol. 15, No. 7, Apr. 1, 1990, 351-353.

Primary Examiner—Bruce Y. Arnold
Assistant Examiner—Darryl Collins
Attorney, Agent, or Firm—Nilles & Nilles

[57] ABSTRACT

A high finesse holographic Fabry-Perot etalon and method of making a high finesse holographic Fabry-Perot etalon is disclosed. Particularly, a holographic Fabry-Perot etalon which achieves high finesse despite non-flat interfaces between the etalon media is presented. In a preferred method of fabricating a high finesse Fabry-Perot etalon, single step recording of both holograms simultaneously, with the spacer and substrates in place, is employed which preserves full phase synchronization between the holograms. In spite of imperfections or irregularities of the interface surfaces of the substrates or spacers, the holographic fringes in the holograms remain flat even for slightly different refractive indices between the various media. The position and flatness of the fringes remains similar to perfect Fabry-Perot etalon structure.

22 Claims, 9 Drawing Sheets

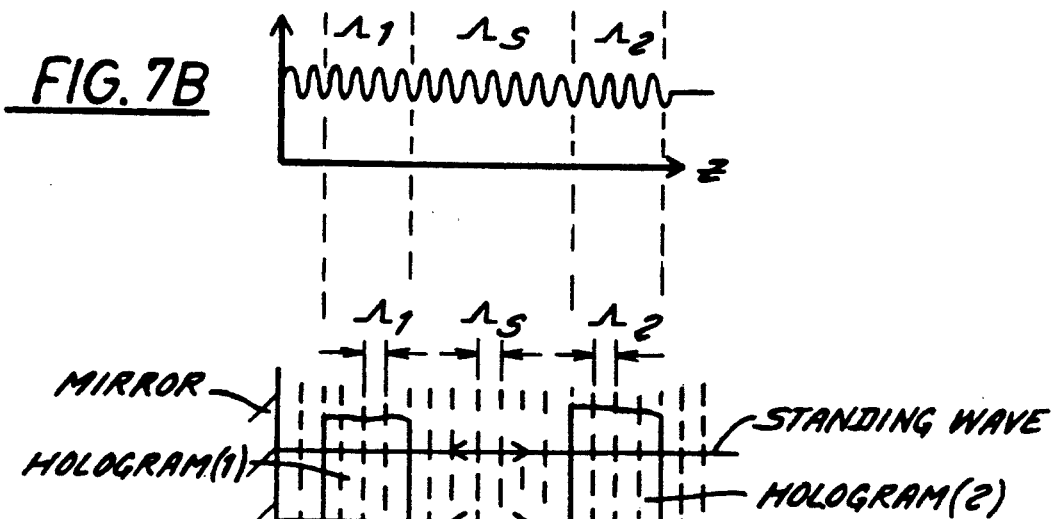
FIG. 7B
FIG. 7A
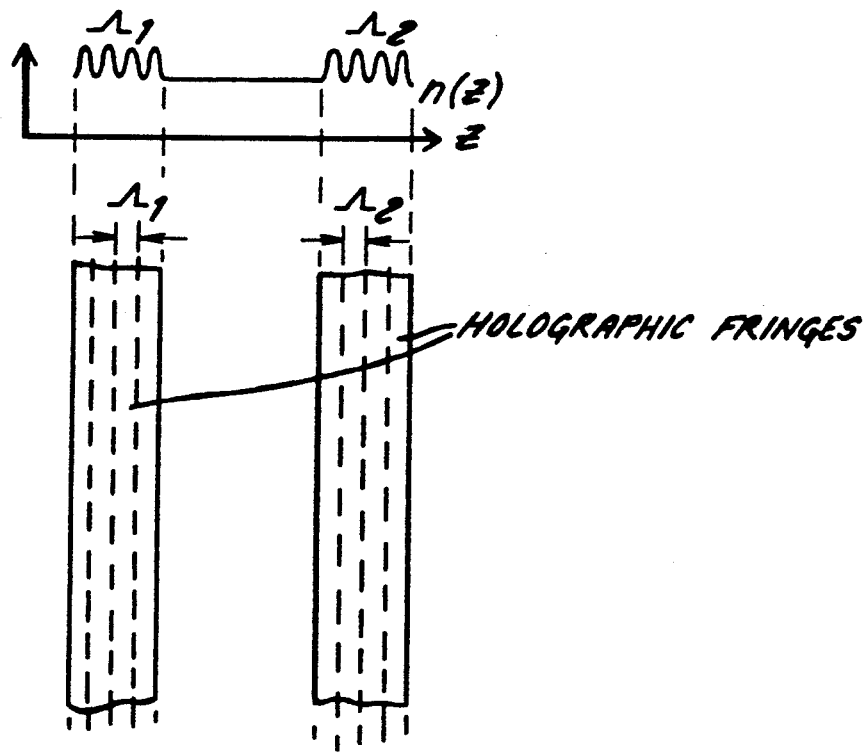
FIG. 8B
FIG. 8A

HIGH FINESSE HOLOGRAPHIC FABRY-PEROT ETALON AND METHOD OF FABRICATING

BACKGROUND OF THE INVENTION

1. Field of the Invention

This invention pertains to Fabry-Perot etalons. More particularly, this invention relates to holographic Fabry-Perot etalons and a method for making high finesse Fabry-Perot etalons.

2. Background of the Prior Art

Fabry-Perot etalons based on two mirror systems separated by a spacer have been extensively discussed in the literature. See M. Born and E. Wolf, "Principles of Optics" Pergamon Press (1980) incorporated herein by reference. The mirrors used can be of different types—metallic, dielectric multi-layer, or other mirroring surfaces. The spacers used can also be of varying types including air, ordinary plastics, glass plates, and electrooptic (E-O) materials such as liquid crystal (LC), PLZT (PbLa(TiZr)O$_3$ and piezoelectric material, and others. The general theory of conventional Fabry-Perot etalons is very well known and can be based on wave theory or an optical multi-reflection model. The crucial parameters of Fabry-Perot etalon theory are the individual mirror reflectivities, R, and optical path length defining multi-reflection phase relation of optical beams reflected numerous times between the two mirrors. This can be described by the following equation:

$$\delta = \frac{4\pi}{\lambda_0} nd \cos\theta \qquad \text{(Eq. 1)}$$

where $\lambda_0$ is the wavelength of light in vacuum, $\theta$ is the angle of incidence, n is the refractive index of the spacer, and d is spacer thickness. In the absence of optical losses, the Fabry-Perot etalon intensity reflection coefficient $R_{FP}$ has the form:

$$R_{FP} = \frac{\frac{4R}{(1-R)^2} \sin^2\left(\frac{\delta}{2}\right)}{1 + \frac{4R}{(1-R)^2} \sin^2\left(\frac{\delta}{2}\right)} \qquad \text{(Eq. 2)}$$

where R is the intensity reflection coefficient of a single mirror, assuming both mirrors are identical. Analogously, the Fabry-Perot etalon intensity transmission coefficient has the following form:

$$T_{FP} = \frac{1}{1 + \frac{4R}{(1-R)^2} \sin^2\left(\frac{\delta}{2}\right)}. \qquad \text{(Eq. 3)}$$

From Equations 2 and 3, it is seen that due to the phase coupling of the two mirrors, such that $\delta = n\pi$, where n is any even integer, the etalon reflectivity is zero and the etalon transmission is 1.0, even though the individual mirrors may be highly reflective. Following Equation 3, etalon transmission versus optical frequency $$\nu = C_0/\lambda_0,$$

where c is the speed of light in vacuum, has the following approximate form as shown in FIG. 1. In FIG. 1, $\Delta\nu$ is the free spectral range (FSR) and $\delta\nu$ is the full width at half maximum (FWHM). The finesse, F, of the etalon is defined as the ratio of $$F = \frac{\Delta\nu}{\delta\nu} = \frac{FSR}{FWHM}. \qquad \text{(Eq. 4)}$$

Assuming that all etalon interfaces are perfectly flat, the finesse parameter has the following form:

$$F = \frac{\pi\sqrt{R}}{1-R}. \qquad \text{(Eq. 5)}$$

Analogously, the contrast factor C is the ratio of the maximum to minimum transmittance of the Fabry-Perot etalon and is as follows:, $$C = \left(\frac{1+R}{1-R}\right)^2 \qquad \text{(Eq. 6)}$$

Assuming high mirror reflectances of the Fabry-Perot etalon (R > 0.9), the above two formulas can be simplified to the following useful forms:

$$F \approx \frac{\pi}{1-R} \qquad \text{(Eq. 7)}$$

and $$C \approx \frac{4}{(1-R)^2}. \qquad \text{(Eq. 8)}$$

Equation 8 can be used to determine the minimum transmittance and the maximum optical density which characterize the maximum rejection of the optical beam by the etalon. Now we obtain $$O.D. = -\log T_{MIN} = -\log \frac{(1-R)^2}{4}. \qquad \text{(Eq. 9)}$$

The filtering properties of the etalon are determined by the etalon linewidths in the form:

$$\delta\nu = \frac{C_o}{2nlF} \qquad \text{(Eq. 10)}$$

wherein the linewidth $\delta\nu$ is related to the FWHM as follows:

$$\delta\nu = \frac{C_o}{\lambda^2} \cdot \delta\lambda. \qquad \text{(Eq. 11)}$$

Using Equations 10 and 11 the thickness l required in order to obtain predetermined line widths can be determined as follows:

$$l = \frac{\lambda \frac{\lambda}{\delta\lambda}}{2nF}. \qquad \text{(Eq. 12)}$$

For example, in order to obtain $\delta\lambda = 2\text{Å}$ and $\Delta\lambda = 13.9$ nm, the required finesse F is $$F = \frac{\Delta\lambda}{\delta\lambda} = 69 \text{ (for } R = 0.95\text{)},$$

and for $\lambda = 0.5\mu$ and $n = 1.5$ the required thickness $l$ of the spacer is $6\mu m$. The relationship between etalon linewidths and angular field of view (FOV) can be obtained from Equation 1 in the form:

$$\frac{\delta\lambda}{\lambda} = \theta^2 \qquad \text{(Eq. 13)}$$

This relation is reflected in Table 1:

TABLE 1

| $\delta\lambda$ | 10 nm | 1 nm | 5Å | 2Å | 1Å |
|---|---|---|---|---|---|
| $\theta$ | .14 | .04 | .03 | .02 | .01 |

The following important relationship defines the influence of spacer flatness on etalon finesse F.

$$\frac{\sigma_l}{\lambda} < \frac{1-R}{4\pi n} \qquad \text{(Eq. 14)}$$

where $\sigma_l$ is root mean square (RMS) of spacer flatness. If Equation 14 is satisfied, then the fundamental parameter defining etalon finesse is the reflection coefficient R, and Equation 5 holds. Otherwise, the fundamental parameter determining etalon finesse is surface flatness determined by RMS $\sigma_l$. It is useful to replace the RMS parameter by $$\sigma_l = \frac{\lambda}{N} \qquad \text{(Eq. 15)}$$

where N defines the fraction of a wavelength characterizing surface flatness. For example, for $\lambda = 1\mu$ and $N = 10$, the surface flatness RMS is $0.1\mu$ which is a typical flatness for good optical quality surfaces. Using Equation 15, Equation 14 can be transformed into:

$$N > \frac{4\pi n}{1 - R}. \qquad \text{(Eq. 16)}$$

This equation is illustrated in Table 2.

TABLE 2

| R | .8 | .85 | .9 | .95 | .99 |
|---|---|---|---|---|---|
| F | 14 | 19 | 30 | 61 | 312 |
| N | 93 | 126 | 189 | 378 | 1890 |

It is seen from this table that even obtaining moderate finesse etalons requires interfaces having very high surface flatness, greatly exceeding typical high optical quality surfaces. For example, in order to obtain a moderate finesse etalon of $F = 61$, N must be 378. That is, the surface roughness must only be 1/378 of the wavelength $\lambda$, which for $\lambda = 500$ nm is on the order of a nanometer. This extremely high smoothness obviously cannot be obtained by known low-cost polishing techniques. It would be highly beneficial to have a method of manufacturing high finesse etalons using only moderately smooth interfaces on the order of $N = 10$.

SUMMARY OF THE INVENTION

A high finesse holographic Fabry-Perot etalon and method of making a high finesse holographic Fabry-Perot etalon is disclosed. Particularly, a holographic Fabry-Perot etalon which achieves high finesse despite non-flat interfaces between the etalon media is presented. In a preferred method of fabricating a high finesse Fabry-Perot etalon, single step recording of both holograms simultaneously, with the spacer and substrates in place, is employed which preserves full phase synchronization between the holograms. In spite of imperfections or irregularities of the interface surfaces of the substrates or spacers, the holographic fringes in the holograms remain flat even for slightly different refractive indices between the various media. The position and flatness of the fringes remains similar to perfect Fabry-Perot etalon structure.

A preferred method of producing a high finesse Fabry-Perot etalon involves providing a reference mirror having a high optical quality surface on the order of $\lambda/100$ for recording; providing internal interfaces on the spacer and substrates of moderate optical quality on the order of $\lambda/10$; providing a holographic material the recorded structure of which does not change during processing, and employing a single step holographic recording of both holograms simultaneously after assembly of the substrate, spacer, and coating of the holographic material.

In a further preferred method of producing a high finesse Fabry-Perot etalon the following steps are employed:

1. Providing a flat having a front surface having high optical quality on the order of $\lambda/100$ and an interface surface having moderate optical quality on the order of $\lambda/10$ and making a holographic coating on the interface surface;
2. Providing a second flat having a back surface and an interface of moderate optical quality on the order of $\lambda/10$ and making a holographic coating on the interface;
3. Providing a mirror with high optical quality on the order of $\lambda/100$;
4. Providing a spacer having moderate surface quality on the order of $\lambda/10$;
5. Integrating the coated flats and spacer to form a Fabry-Perot etalon and employing a matching medium between the elements and the reference mirror;
6. Recording the integrated elements by a single step holographic process;
7. Removing the reference mirror.
8. Processing the holograms if necessary.

In yet another preferred method for producing a high finesse Fabry-Perot etalon the following steps are employed:

1. Providing a spacer having moderate surface quality on the order of $\lambda/10$;
2. Coating both sides of the spacer with a holographic thin film;
3. Providing a flat substrate having a high optical quality surface on the order of $\lambda/100$ on one side and having moderate optical quality on the order of $\lambda/10$ on the other side;
4. Providing a reference mirror having high optical quality on the order of $\lambda/100$;
5. Integrating the film coated spacer, and flat, to form a Fabry-Perot etalon and employing a matching medium between the elements and the reference mirror; and
6. Recording the integrated elements by a single step holographic process.
7. Removing the reference mirror.
8. Processing the holograms if necessary.

The Fabry-Perot etalon of the present invention may be made tunable by using as the spacer liquid crystal, PLZT, piezoelectric material, or other voltage responsive materials. In such tunable etalons, the etalon transmission characteristic is shifted according to voltage.

Curved Fabry-Perot etalons of high finesse are also made possible by the process disclosed. In one preferred recording arrangement, a curved mirror is used for recording flat holographic plates with slanted structures. In a second preferred set up for recording a curved Fabry-Perot etalon, a curved mirror is used for recording as well as curved holographic mirrors in which holographic fringes are recorded parallel to the surface of the hologram and the curvature of the mirror. Finally, a Fabry-Perot etalon recording set up using phase conjugate mirrors to reverse the wavefront during reflection to insure flatness of the wavefront despite non-uniformity inside the etalon structure is disclosed. Lastly, a spatial light modulator comprising an array of tunable holographic Fabry-Perot etalons of the present invention which are driven by a multi-pixel voltage driving electronic system standard in the art is disclosed.

DESCRIPTION OF THE DRAWINGS

FIGS. 7A and B are cross-sectional schematics of a preferred recording up and the standing waves generated during recording of the holographic Fabry-Perot structure respectively;

FIGS. 8A and B are cross-sectional schematics of the holographic fringes in the holographic Fabry-Perot structure after recording;

DESCRIPTION OF THE PREFERRED EMBODIMENTS

In accordance with the method of the present invention of producing high finesse Fabry-Perot etalons, a drastically different approach than methods known previously is used. In conventional methods, using either metallic mirrors or interference multi-layers, the mirror structures are evaporated on both sides of the spacer, and the smoothness of the mirror structure naturally follows the smoothness (or roughness) of the spacer. Therefore, it is very difficult to obtain high finesse etalons using conventional methods since flatness is required and determined by large N numbers on the order of 100-300.

Another shortcoming of conventional etalons is related to the fact that it is difficult to apply evaporating techniques to very thin spacers on the order of a few micrometers. Even more difficult is to obtain curved mirror structures providing Fabry-Perot etalons with curved mirrors.

Figure 1:
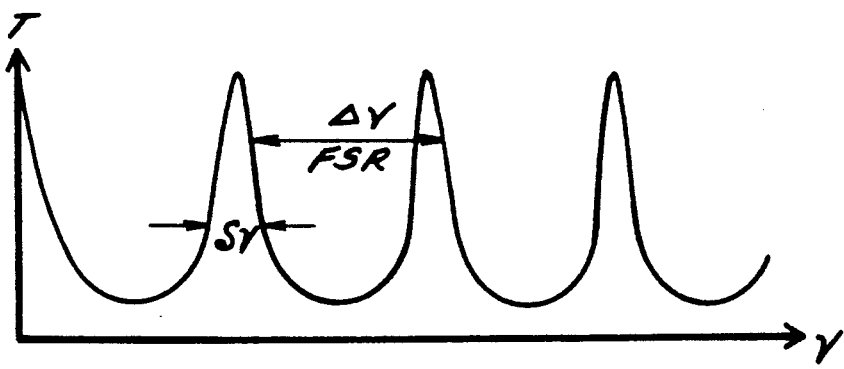
FIG. 1 is a graph depicting etalon transmission versus optical frequency in general.
Figure 2:
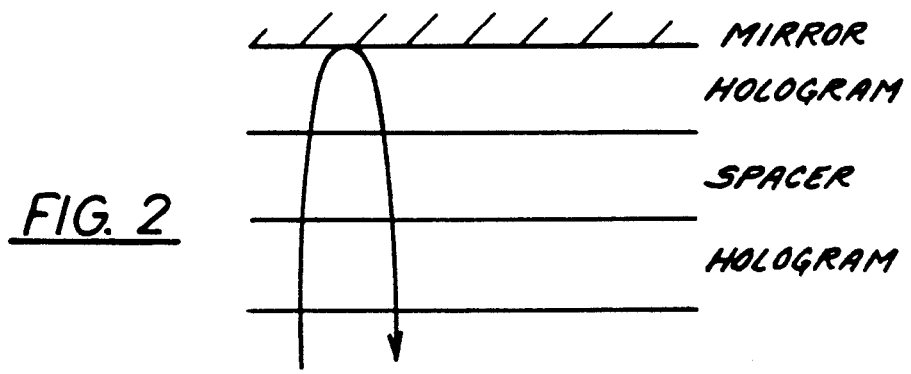
FIG. 2 a cross-sectional schematic of a preferred holographic recording set up.
Figure 3:
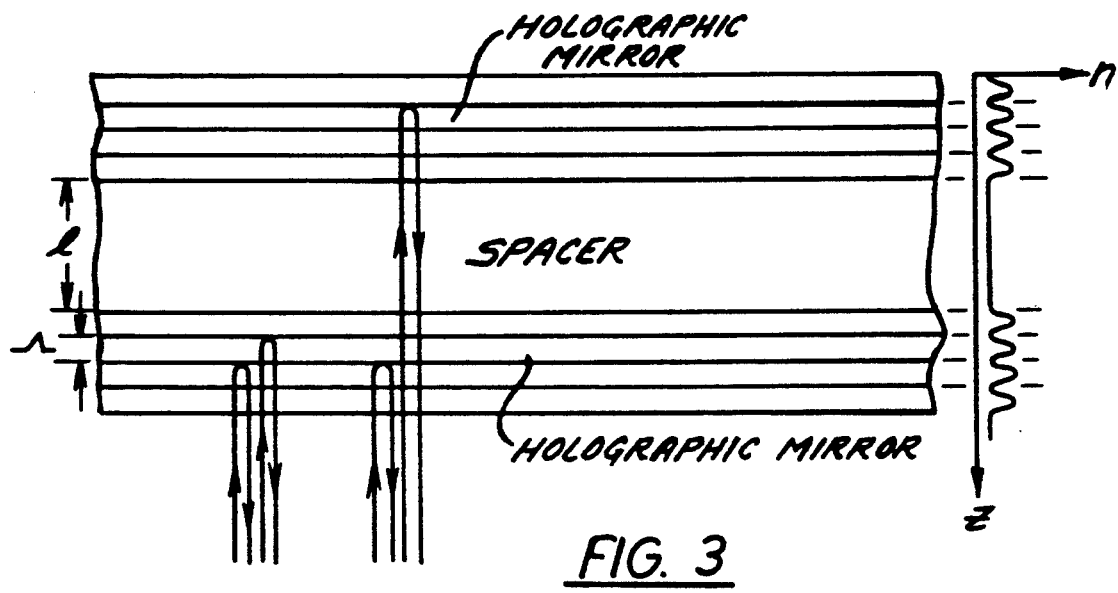
FIG. 3 is a cross-sectional schematic of the recording of two holographic structures having the spacer located between them during recording and which provide constructive interference under proper readout conditions.

The method herein is based on a single step holographic recording of both mirrors simultaneously with the spacer already installed in the system. A preferred holographic recording setup is illustrated in FIG. 2. Due to single step recording of both holograms simultaneously, full phase synchronization is preserved between the two holograms assuming that the properties of the holographic material do not change during holographic processing. As a result, two standing wave structures are recorded as shown in FIG. 3. In FIG. 3 two holographic structures having sinusoidal modulation substructures are recorded with the spacer already between. Therefore, the two structures which reflect the optical beam illustrated in this figure provide constructive interference assuming that read-out conditions are identical to recording conditions.

Figure 4:
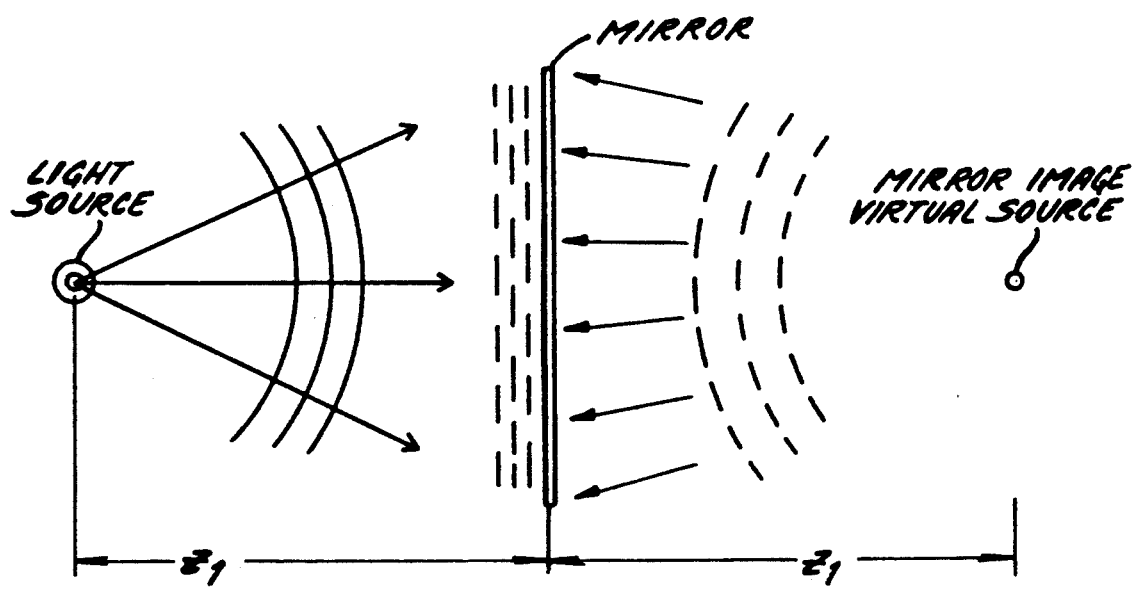
FIG. 4 is a cross-sectional schematic of a spherical incident wave reflected from a perfect mirror and showing flat holographic fringes near the surface of the mirror during fabrication.

In order to fully illustrate that the method of fabrication presented herein provides high etalon finesse, we consider the following simple example of a spherical incident wave reflected from a perfect mirror as shown in FIG. 4. It can be seen that the beam reflected from the mirror is equivalent to the spherical wave emitted from the mirror source. The standing wave created by the incident wave and the reflected wave results in interference which is perfectly flat (like the mirror) if close to the mirror.

The above simple illustration shows that the holographic fringes of the hologram close to the mirror are flat in spite of the formation of the incident wavefront. These wavefront formations can be created either by direct non-uniformities in the incident wavefronts or by non-flatness of the interfaces which are located within the wavefront passage.

Figure 5:
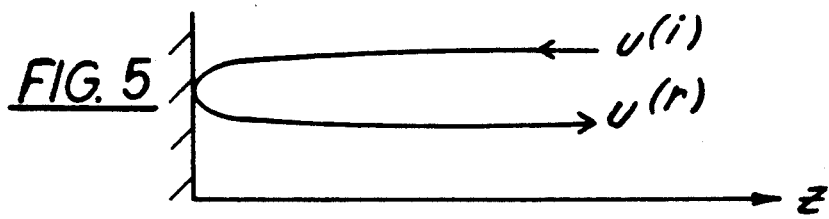
FIG. 5 is a cross-sectional schematic of an incident wavefront amplitude $\mu^{(i)}$ and reflected wavefront amplitude $\mu^{(r)}$ during fabrication.

In order to obtain these relationships in a more quantitative way, we consider an incident wavefront amplitude $\mu^{(i)}$ as illustrated in FIG. 5 and expressed in the form:

$$\mu^{(i)} = e^{(-ikzn)} e^{i\alpha} \quad \text{(Eq. 17)}$$

$$\mu^{(i)} = r_m e^{(ikzn)} e^{i\alpha} \quad \text{(Eq. 18)}$$

where $\alpha$ is the initial phase of the incident beam. The time dependent phase factor $e^{i\omega t}$ has been omitted in these equations. The complex reflectance, $r_m$, has the form:

$$r_m = |r_m| e^{i\theta} \quad \text{(Eq. 19)}$$

The amplitude of the reflected wave can be written in the form:

$$\mathbf{8}2^{(r)} = |r_m| e^{(ikzn)} e^{i\alpha} e^{i\theta} \quad \text{(Eq. 20)}$$

and the intensity of the standing wave is:

$$I = |\mu^{(i)} + \mu^{(r)}|^2 + |\mu^{(r)}|^2 + \mu^{(i)*} + \mu^{(r)} + \mu^{(i)} \mu^{(r)*} \quad \text{(Eq. 21)}$$

where the * indicates the complex conjugate.

One of the interference terms is now considered:

$$\mu^{(i)*} \mu^{(r)} = e^{(ikzn)} e^{(i\alpha)} |r_m| e^{i\theta} \cdot e^{(ikzn)} = e^{(2iknz)} |r_m| e^{i\theta} \quad \text{(Eq. 22)}$$

and for intensity I the following is obtained:

$$I = |\mu^{(i)}|^2 + |\mu^{(r)}|^2 + 2|r_m| \cos(2knz + \theta) = 1 + r_m^2 + 2|r_m| \cos(2knz + \theta) \quad \text{(Eq. 23)}$$

Now using the equation $$2 \cdot \frac{2\pi}{\lambda} n \cdot \Lambda = 2\pi \quad \text{(Eq. 24)}$$

we obtain the standing wave phase $\phi$ in the form:

$$\phi = \frac{2\pi \cdot z}{\Lambda} + \theta \quad \text{(Eq. 25)}$$

where $\Lambda$ is the standing wave period in the form $\Lambda = \lambda/2n$. Now using Equation 25, Equation 23 becomes $$I = 1 + |r_m| + 2|r_m| \cos \theta \quad \text{(Eq. 26)}$$

where $$\Phi = \pm\pi, \pm 3\pi, \pm 5\pi \quad \text{(Eq. 27)}$$

which determines the nodes of the standing wave.

Figure 6:
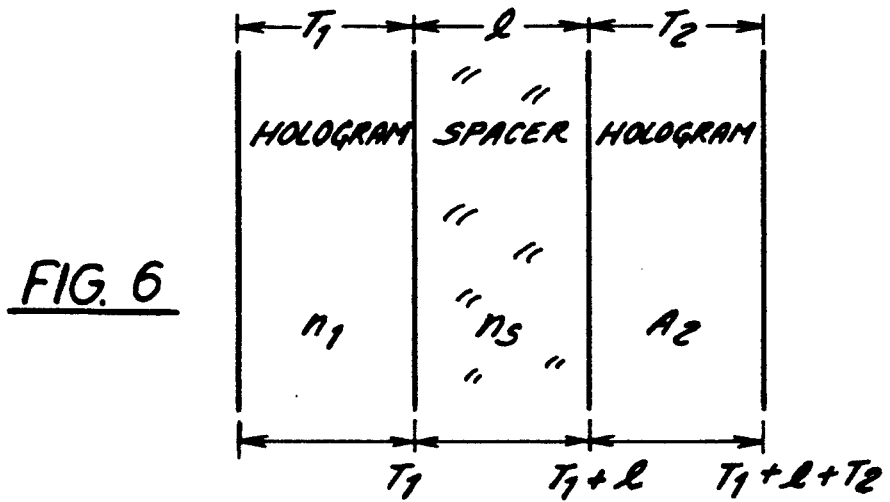
FIG. 6 is a cross-sectional schematic of a three medium system of the present invention.

Only one medium was considered above. The above model is now applied to a three media system illustrated in FIG. 6, and recorded using a standing wave recording set up as shown in FIGS. 7A and B, and resulting in holographic fringes as shown in FIGS. 8A and 8B. In FIG. 7A, the first medium represents a first hologram with thickness $T_1$ and average refractive index $n_1$, the second medium represents a spacer with thickness $l$ and average refractive index $n_s$, and the third medium represents the second hologram with thickness $T_2$ and average refractive index $n_2$. Each of the media has a grating period $\Lambda_1$, $\Lambda_2$, and $\Lambda_s$ which are the spatial periods of the standing wave structure following the exposure distribution E(z). The above standing wave structure, as shown in FIG. 7B, will be recorded in the form of holographic fringes as shown in FIGS. 8A and 8B with grating periods $\Lambda_1$, $\theta_2$ identical to those in FIG. 7A.

Using Equation 25 from above, we get the following phase value $\phi$ for the interface between the first hologram and the spacer:

$$\phi(T_1) = \frac{2\pi \cdot T_1}{\Lambda_1} + \theta \quad \text{(Eq. 27)}$$

where $$\Lambda_1 = \frac{\lambda}{2n_1}$$

is the standing wave period in the first holographic medium. Assuming phase continuity at the boundary, we can write the analogous equations for the next two interfaces in the form:

$$\phi(T_1 + l) = \frac{2\pi T_1}{\Lambda_1} + \frac{2\pi l}{\Lambda_s} + \theta; \Lambda_s = \frac{\lambda}{2n_s} \quad \text{(Eq. 28)}$$

and $$\phi(T_1 + T_2 + l) = \frac{2\pi T_1}{\Lambda_1} + \frac{2\pi l}{\Lambda_s} + \frac{2\pi T_2}{\Lambda_2} + \theta. \quad \text{(Eq. 29)}$$

Until now we have considered a Fabry-Perot etalon with perfectly flat interfaces. Assuming slightly varying non-flatness of the interfaces, we can consider the interfaces to be locally parallel. Therefore, we can use the above model for non-flat interfaces.

As an example, non-flat interfaces which still preserve the same refractive indices of all three media are first considered. Therefore $$n_1 = n_2 = n_s \quad \text{(Eq. 30)}$$

and it is assumed the thickness of each medium is changed by a factor $\Delta$ as follows:

$$T_1 \rightarrow T_1 + \Delta_1$$
$$T_2 \rightarrow T_2 + \Delta_2 \quad \text{(Eq. 31)}$$
$$l \rightarrow l - (\Delta_1 + \Delta_2)$$

yet total thickness of the system is preserved as before.

The maximum phase change of the standing wave fringes in this non-flat system having the same refractive index throughout is determined by $$(\Delta\phi)_a = (\Delta\phi)(T_1 + T_2 + l) = 0 \quad \text{(Eq. 32)}$$

and therefore full compensation for the position of the fringes is still achieved. In other words, the position of the fringes does not change in spite of the change in the thickness of each of the medium.

As a second example, a change in the refractive index of the spacer is considered in addition to media thickness changes. In particular, it is assumed that the refractive index of the spacer is different than that of the holograms. And so $$n_1 = n_2 \neq n_s \qquad (Eq. 33).$$

In such a case the following equation obtains:

$$(\Delta\phi)_a = \frac{2\pi}{\Lambda_1}(\Delta_1 + \Delta_2) - \frac{2\pi}{\Lambda_s}(\Delta_1 + \Delta_2) = \qquad (Eq. 34)$$

$$\frac{2\pi}{\lambda} 2(\Delta_1 + \Delta_2)(n_1 - n_s)$$

assuming $$\Delta_1 + \Delta_2 = \frac{\lambda}{n}$$

which states that the total change in thickness is a fraction of the wavelength $\lambda$ (assuming $\Delta n = n_1 - n_s$). We then obtain the following fundamental relationship for the maximum change in phase with respect to the distance between two adjacent fringes. We obtain an equation in the form:

$$\frac{(\Delta\phi)_{max}}{2\pi} = \frac{2\Delta n}{n} . \qquad (Eq. 35)$$

As a result of Equation 35 it is seen that if $\Delta << N$ then $\Delta\phi_{max} << 2\pi$. This means that even if the thickness of any of the media changes, but $\Delta n << N$, the location of the fringes remains constant. Thus, fringe stability is very high.

Figure 9:
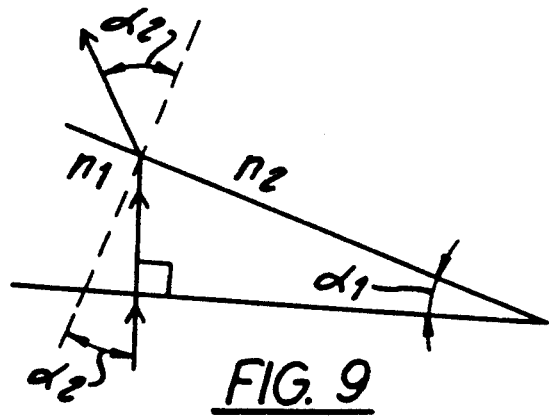
FIG. 9 is a cross-sectional schematic of the refraction of a wave at an in having refractive indices n1 and n2.

In order to consider slanted holographic fringes on a flat interface, we consider the refraction of the wave at an interface with refractive indices $n_1$ and $n_2$ as shown in FIG. 9. According to Snell's Law $$\frac{\sin\alpha_2}{\sin\alpha_1} = \frac{n_1}{n_2} \qquad (Eq. 36)$$

and assuming the angles $\alpha_1$ and $\alpha_2$ as well as $n_1$ and $n_2$ are only slightly different respectively, and $\alpha_1 << 1$, Equation 36 reduces to the following:

$$\frac{n_1}{n_2} = \frac{n_1}{N_1 \delta n} = 1 + \frac{\delta n}{n_1} \qquad (Eq. 37)$$

and finally we obtain $$\delta\alpha = \sin\alpha_1 \frac{\delta n}{n_1} . \qquad (Eq. 38)$$

Figure 10:
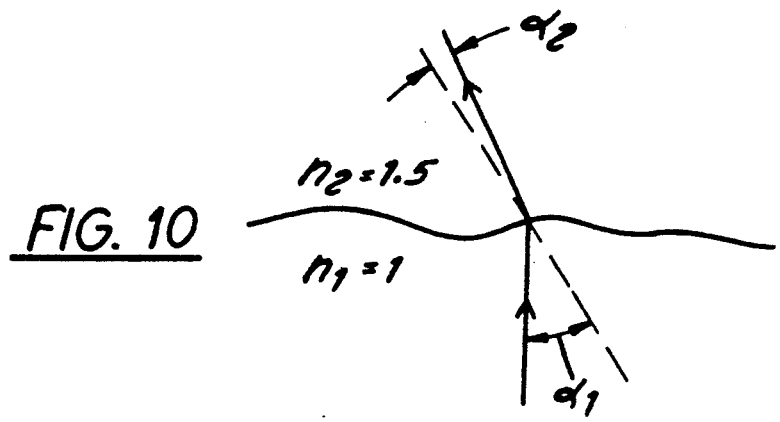
FIG. 10 is a cross-sectional schematic of a wave refracted from an interface having significantly different refractive indices n1 and n2.

Since both product components $\sin\theta_1$ and $$\delta\alpha/n_1$$

are very small, the product $\delta\alpha$ is a small quantity of the second order. Therefore, we have $$\delta\alpha < 1 \qquad (Eq. 39)$$

and the holographic fringes remain flat. The most difficult case is presented by the refraction of a wave from a non-flat front interface where the refractive indices $n_1$ and $n_2$ are drastically different, e.g., $n_1 = 1$ and $n_2 = 1.5$ as shown in FIG. 10. Using the same model as before, Equation 36 reduces to the form:

$$\frac{\sin\alpha_2}{\sin\alpha_1} = 1 + \frac{\delta\alpha}{\sin\alpha_1} = \frac{n_1}{n_2} = \frac{1}{1.5} = \frac{2}{3} = 0.6. \qquad (Eq. 40)$$

And instead of Equation 38, the following equation obtains:

$$\delta\alpha = \sin\alpha_1 \cdot 0.6 \qquad (Eq. 41)$$

It is seen that contrary to Equation 38, only one component of the product is small assuming $\alpha_1 << 1$. Still, $\Delta\alpha$ remains small. Therefore, the holographic fringes remain flat in spite of refraction on the non-flat interface. The next effect to be considered is the change of grating period $\Lambda$ with fringe slant. In this case, the period of the slanted wave is $$\Lambda = \frac{\lambda}{2n\cos\alpha_2} \qquad (Eq. 42)$$

where the slant for normal incidence is $$\Lambda_o = \frac{\lambda}{2n} . \qquad (Eq. 43)$$

Therefore, the relative change of grating constant is described by $$\frac{\Lambda - \Lambda_o}{\Lambda_o} = \frac{\Delta\Lambda}{\Lambda_o} = \frac{\frac{1}{\cos\alpha_2} - 1}{1} = \qquad (Eq. 44)$$

$$1 - \cos\alpha_2 = 1 - \left(1 - \frac{\alpha_2^2}{2}\right) = \frac{\alpha_2^2}{2} \sim \frac{\alpha_1^2}{2}$$

and the typical $\alpha_1$ angle is $$\alpha_1 = \frac{\lambda/N}{\Delta l} = \frac{\lambda}{N\Delta\lambda} . \qquad (Eq. 45)$$

Figure 11:
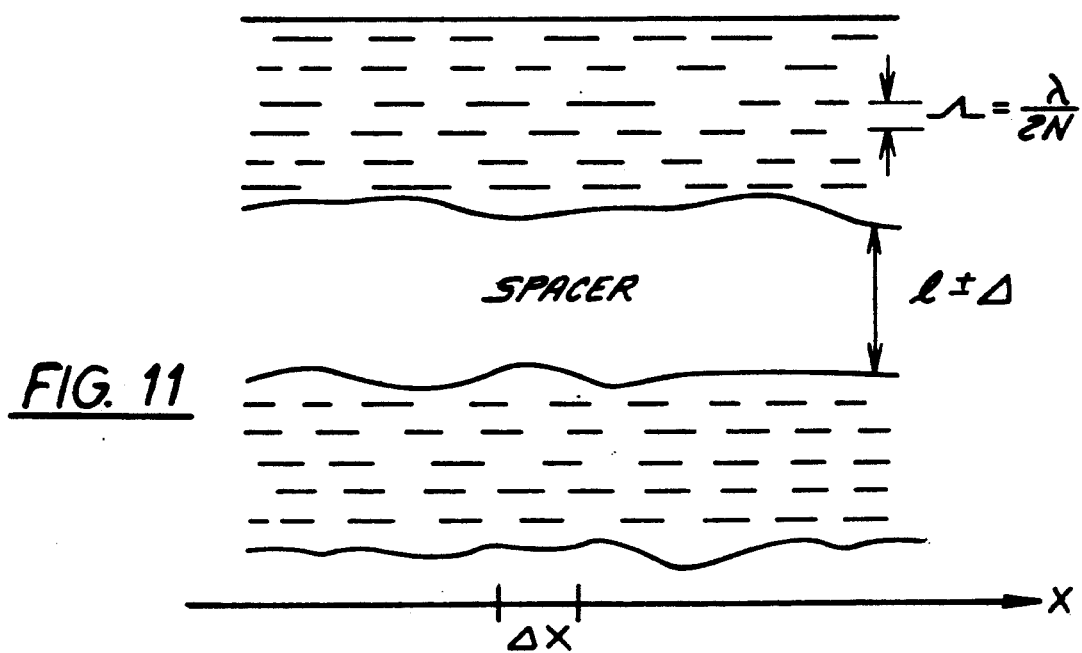
FIG. 11 is a cross-sectional schematic of flat holographic fringes in the holographic mirrors of a Fabry-Perot etalon of the present invention despite non-flat interfaces.

Therefore, for typical (moderate) optical quality flatness of $\lambda/10$ for $\Delta l = 1$ cm, we obtain $\alpha_1 = 10^{-5} = \alpha_2$. Therefore, the relative change of the grating constant is very small, and is on the order of $10^{-10}$. Thus, the following model of the holographic fringes can be considered as correct as shown in FIG. 11.

In spite of imperfect flatness of all interfaces, the fringe structure of the present invention remains flat even for slightly different refractive indices in the various media. In order to calculate the etalon finesse of such a structure, it is necessary to consider a set of Fabry-Perot etalons each having the same fringe structures but a different number of them. The difference between these structures is defined by the parameter $$\Delta \sim \lambda/N \qquad (Eq. 46)$$

for good optical quality interfaces. The non-flatness parameter $\Delta$ can be determined by $$\Delta = \frac{\lambda}{n} \frac{\Delta x}{\Delta l} \qquad (Eq. 47)$$

By this formula, where the surface optical flatness, for example $\lambda=0.5\mu$, $N=10$, and $\Delta l=1$ cm. While $\Delta$ determines the maximum size of the etalon, using the above data, we obtain for $\Delta x=10$ cm $$\Delta = 10\frac{\lambda}{N} \sim \lambda. \qquad \text{(Eq. 48)}$$

Therefore, we consider the maximum thickness changes of the media to be on the order of $\lambda$ for 10 cm holographic etalon plates. Such non-flatness for a conventional Fabry-Perot etalons would completely destroy the fringe structure, while it is quite acceptable for the holographic Fabry-Perot etalon of the present invention as illustrated in the following figures.

All of the above calculations show that despite non-flatness of the internal interfaces, the position and flatness of the fringes remains very similar to a perfect Fabry-Perot etalon structure while only the number of fringes changes.

Figure 12A:
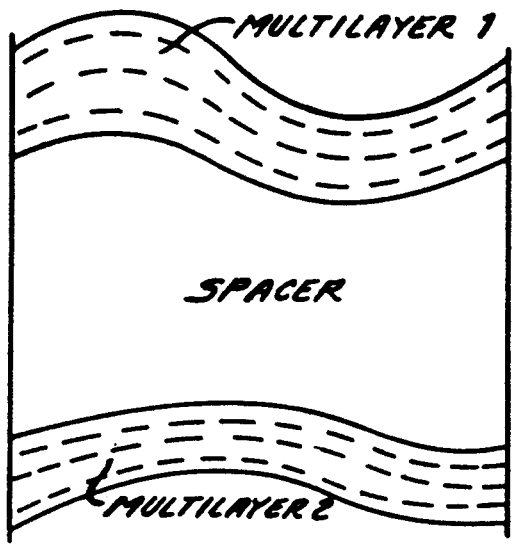
FIG. 12A and B cross-sectional schematics of the curved refractive of a conventional Fabry-Perot etalon having multi-layer dielectric mirrors and the planar holographic fringes recorded in a Fabry-Perot etalon of the present invention non-flat interfaces.
Figure 12B:
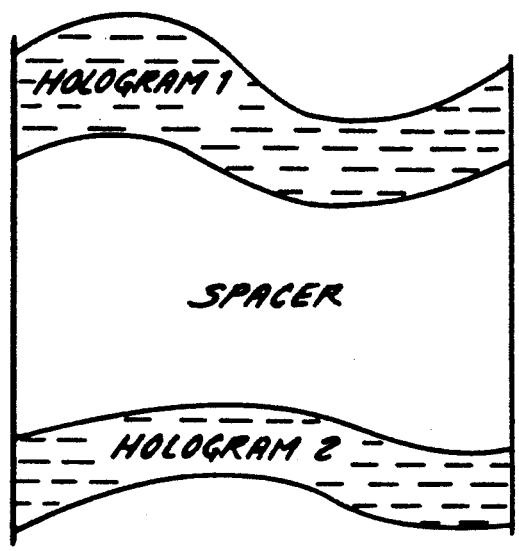

FIGS. 12A and B compare the interface structures for two types of Fabry-Perot etalons. FIG. 12A is a conventional Fabry-Perot etalon having multilayer mirrors and FIG. 12B is a holographic Fabry-Perot etalon having holographic mirrors. In the first case, interference fringes follow the non-flatness of the interfaces while in the second case the holographic fringes remain flat.

The above-analysis provides the necessary tools to make an optimum Fabry-Perot etalon structure. In order to obtain nearly flat holographic fringes, and as a consequence high etalon finesse, we need to satisfy the following general conditions.

1. The mirror and front surface should be of high optical quality, on the order of $N=100$.
2. The flatness of the internal interfaces should be of ordinary optical quality on the order of $N=10$.
3. The holographic material used for recording the etalon holographic mirrors should have processing characteristics such that processing does not change the recording structure, i.e., processing does not change the grating periods $\Lambda_1$ and $\Lambda_2$ which were created during recording. A good example of such a material is DuPont photopolymer which requires no wet processing and where development is achieved by UV light. Also, DCG (dichromated gelatin) remains acceptable if all processing steps are very smooth in the sense that the water/alcohol bath conditions are continuously modified during the multi-step bathing processing operation. The temperature of the water and alcohol and the ratio of alcohol to water should not be drastically changed between adjacent processing baths. Such procedures can provide high etalon finesse, on the order of more than 100, even for large etalon plates with sizes larger than 10 cm.

In the case of DCG, the tradeoff between obtaining high reflectivity holographic mirrors, which is a necessary condition for high finesse, and providing sufficient conditions to obtain smooth processing must be considered. Significant changes in the refractive index during processing, higher than 0.01, and possible deformation of holographic material non-uniformity must be avoided.

Figure 13:
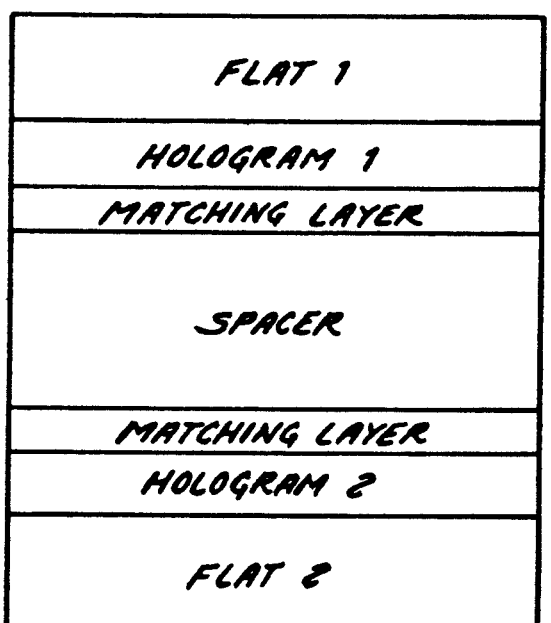
FIG. 13 is a cross-sectional schematic of a preferred arrangement of a high finesse Fabry-Perot etalon of the present invention.

The above-discussed conditions may be fulfilled using the following fabrication steps to produce a Fabry-Perot etalon of the present invention as shown in FIG. 13. Step 1 is to provide a flat (substrate) having a highly flat "front surface" on the order of $\lambda/100$, shown as "Flat 2" in FIGS. 13 and 14. The "interface" of Flat 2 (adjacent hologram 2) can be of moderate optical quality on the order of $\lambda/10$. A holographic coating is made on the interface of Flat 2 as shown in FIG. 14.

Figures 14, 15:
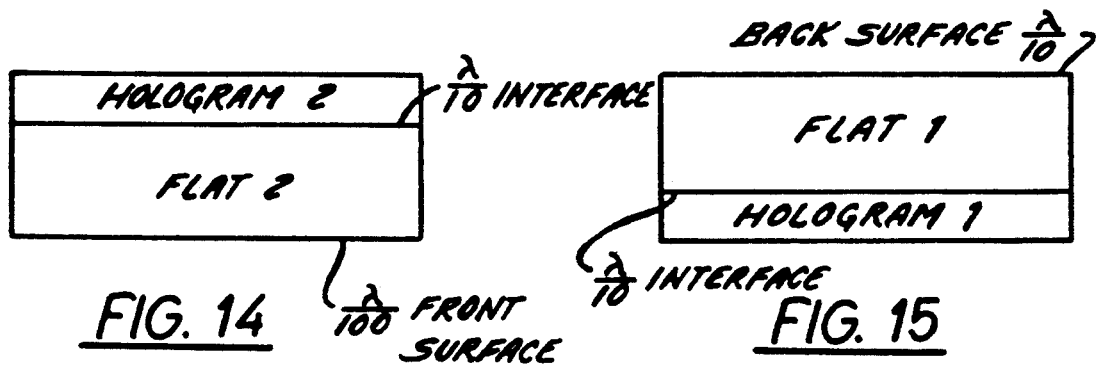
FIG. 14 is a cross-sectional schematic of a portion of the structure of FIG. 13.
FIG. 15 is a cross-sectional schematic of a portion of the structure of FIG. 13.

Step 2 involves providing a flat, "Flat 1", having a back surface and interface of a moderate optical quality on the order of $\lambda/10$, shown as "Flat 1" in FIGS. 13 and 15. A holographic coating is made on the interface of Flat 1 as shown in FIG. 15.

Step 3 is to provide a mirror having high optical quality on the order of $\lambda/100$.

Step 4 is to provide a spacer having moderate flatness on the order of $\lambda/10$.

Step 5 is to integrate all four elements (Hologram 1-Flat 1, Hologram 2-Flat 2, Mirror, and Spacer) by providing a matching layer between each element according to FIG. 13. The matching medium may be an adhesive made for this type of use such as that made by Norland. All refractive indices should be only slightly different with no difference greater than 0.01.

Step 6 is to provide a single step holographic recording using the geometry as shown in FIG. 7A above.

Step 7 is to remove the mirror.

Step 8 is to process the holograms if necessary.

Figures 16, 17:
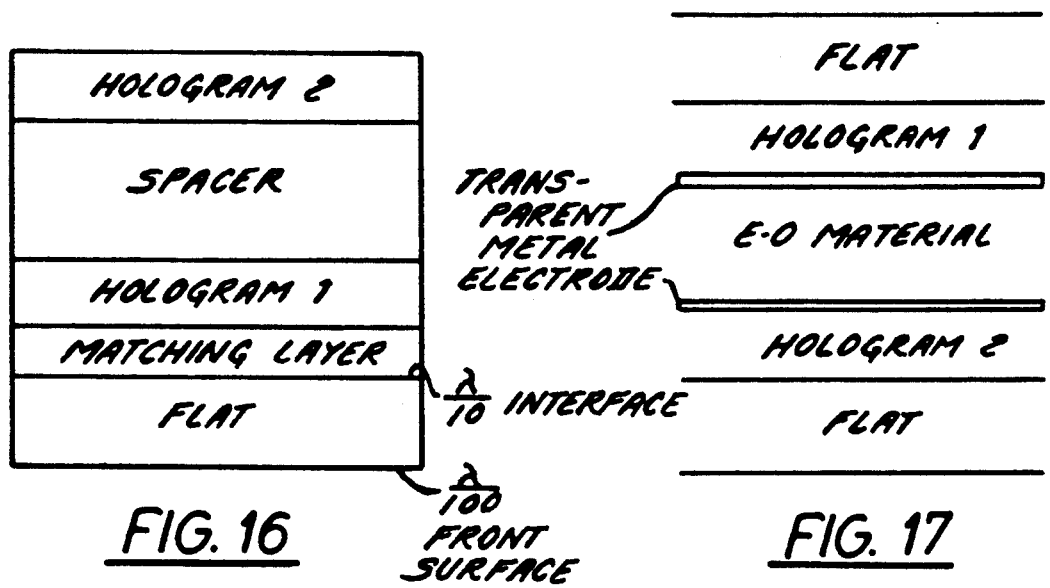
FIG. 16 is a cross-sectional schematic of another preferred Fabry-Perot etalon structure of the present invention.
FIG. 17 is a cross-sectional schematic of a preferred tunable Fabry-Perot etalon of the present invention.

A second procedure which may be followed to satisfy the conditions for flat holographic fringes despite non-flat interfaces and to produce an etalon as depicted in FIG. 16 is now described. Step 1 is to provide a spacer having moderate optical quality on the order of $\lambda/10$.

Step 2 is to provide a holographic coating on both sides of the spacer.

Step 3 is to provide a flat having high optical quality on the order of $\lambda/100$ on the front surface and having moderate optical quality on the order of $\lambda/10$ on the interface.

Step 4 is to provide a mirror having an optical quality of $\lambda/100$.

Step 5 is to integrate the components using a matching medium as before.

Step 6 is to provide a single step holographic recording.

Step 7 is to remove the mirror.

Step 8 is to process the holograms if necessary.

The resulting Fabry-Perot etalon is shown in FIG. 16. The spacer can be of a number of different types, depending on the type of etalon performance desired, either stationary or tunable, or whether a high or low spacer thickness is needed. The typical spacer for very low spacer thickness, on the order of a few microns, is a plastic such as Mylar. Unfortunately, Mylar is highly anisotropic and therefore a glassy material is more preferable. The glassy material may be evaporated on the substrate.

Other types of spacers can simply be free space. It should be emphasized that this new type of Fabry-Perot etalon provides the possibility of using very thin spacers contrary to conventional etalon systems where the evaporating process requires using thick spacers for stability reasons.

In the case of tunable Fabry-Perot etalons, the types of spacers that can be used include liquid crystal (LC) with two metallic electrodes evaporated on both sides of the LC or evaporated on the substrates adjacent to the LC. PLZT, piezoelectric, or others types of spacers may be used. In the case of holographic recording of a tunable system, recording may preferably be accomplished after integration of all elements.

Figure 18:
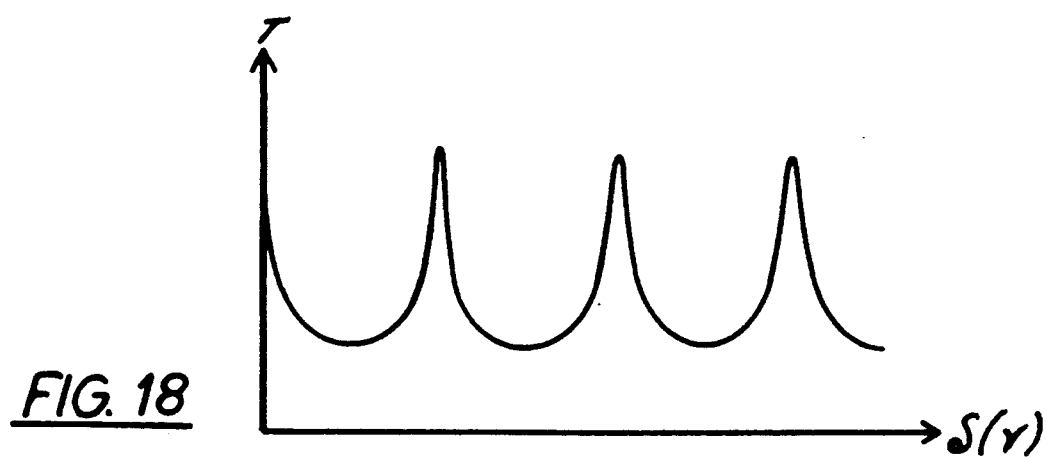
FIG. 18 is a graph plotting transmission versus wavelength as a function of voltage controlled optical path length spacer of the tunable Fabry-Perot etalon of FIG. 17.

A tunable Fabry-Perot etalon is shown in FIG. 17 having metal electrodes sandwiching an electrooptic material. On either side of the sandwich is a flat-hologram subcombination. The refractive index of the EO material constituting the spacer changes according to voltage. Therefore, the etalon transmission characteristic is shifted according to voltage and changes as shown in FIG. 18.

Figure 19:
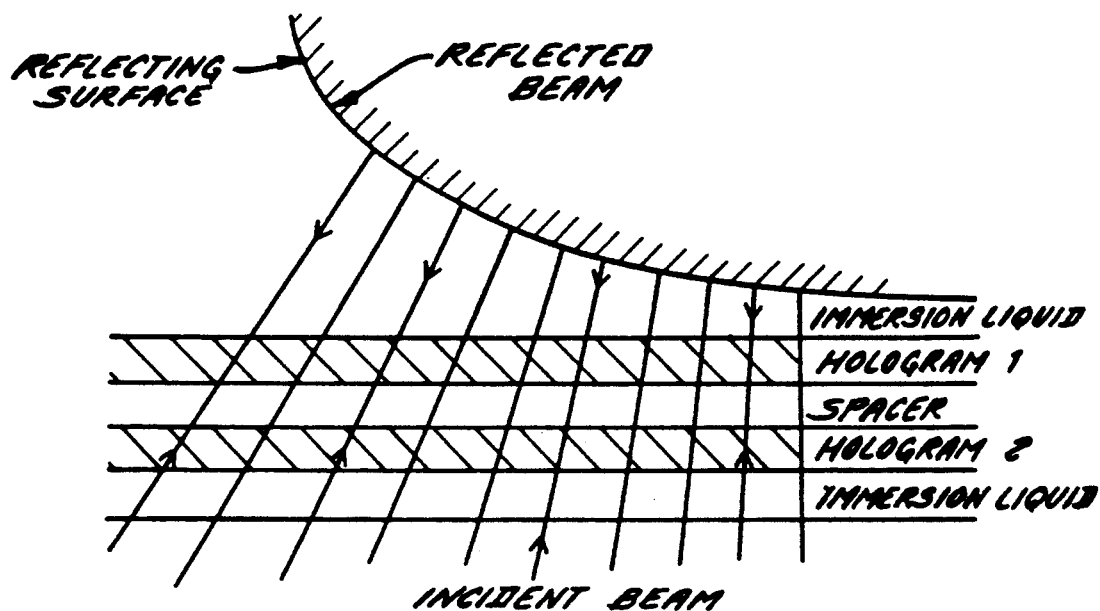
FIG. 19 is a cross-sectional schematic of a recording set up for recording slanted holographic fringes in a flat Fabry-Perot etalon of the present invention using a curved recording mirror.
Figure 20:
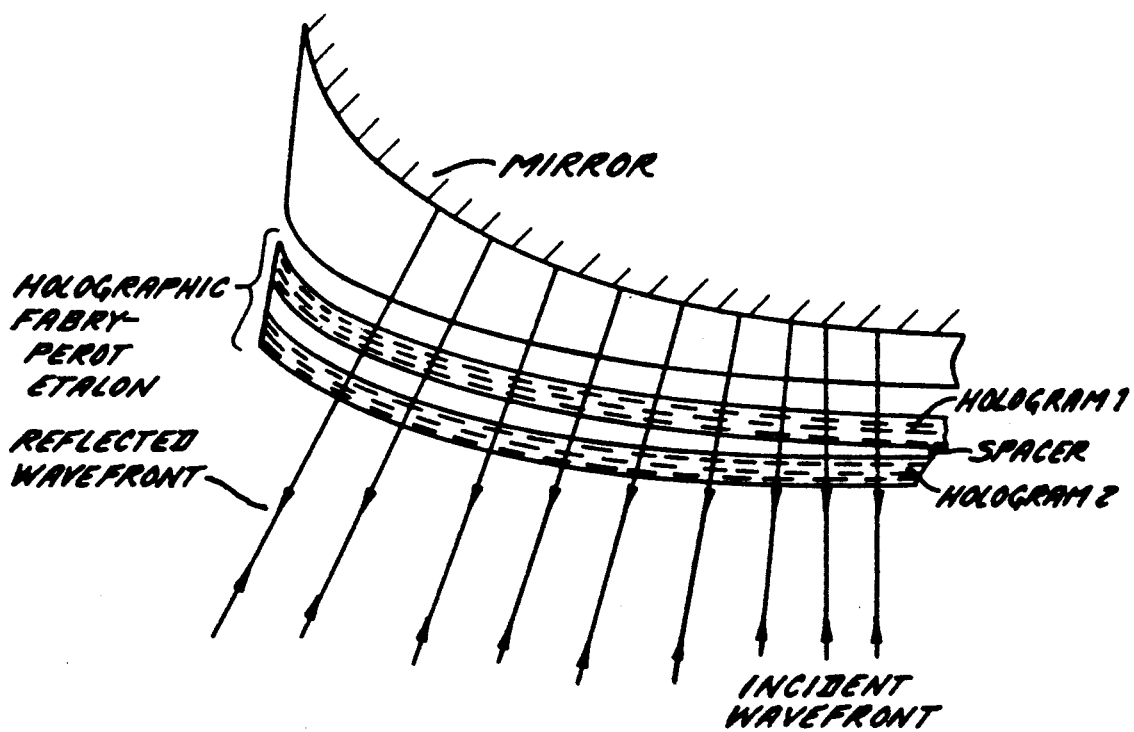
FIG. 20 is a cross-sectional schematic of a preferred recording set up for recording a curved holographic Fabry-Perot etalon of the present invention using a curved recording mirror and curved holographic layers.
Figure 21:
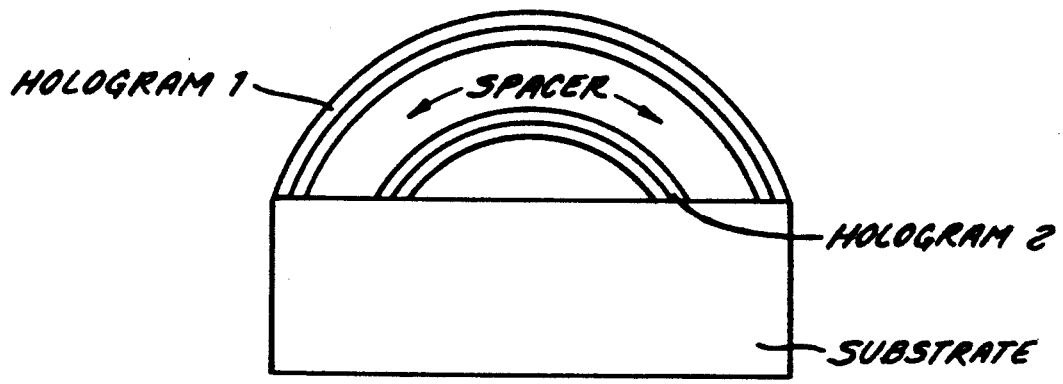
FIG. 21 is a cross-sectional schematic of a curved Lippmann Fabry-Perot etalon of the present invention.
Figure 22A:
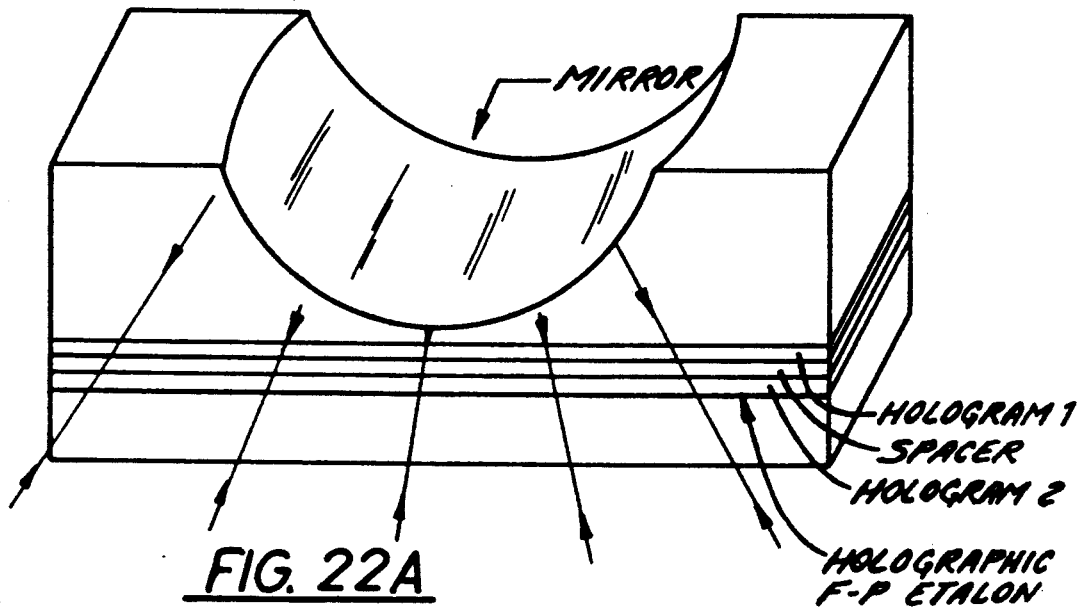
FIGS. 22A and B are a schematic of a 3-dimensional recording structure for a Fabry-Perot etalon of the present invention which employs a curved mirror and slanted fringes recorded in the etalon thereby.
Figure 22B:
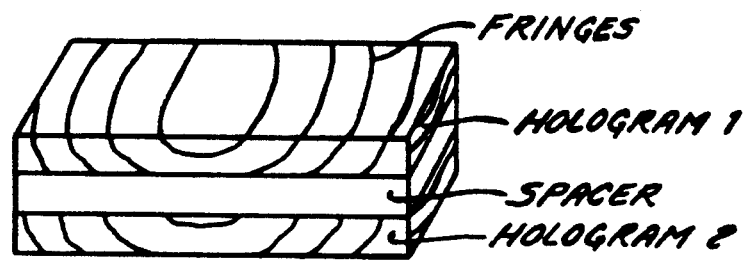

Curved Fabry-Perot etalons are also made possible by the novel process of this invention. In contradistinction to the above approaches, curved mirrors are used for recording. During recording, the holographic etalon structure can be separated from the mirror as illustrated in FIGS. 19 and 20. In FIG. 19, the holographic mirrors are flat and slanted structures are recorded in the flat hologram. In FIG. 20, the curvature of the hologram follows the curvature of the recording mirror, and the holographic fringes are, therefore, parallel to the surface of the hologram and follow the curvature of the recording mirror. In FIG. 21 a Lippmann holographic structure recorded using the set up shown in FIG. 20 is illustrated. FIG. 22A illustrates a three dimensional holographic recording structure which may be used to record slanted fringes using a curved mirror as previously depicted schematically in FIG. 19. FIG. 22B shows the recorded slanted fringes.

Figure 23:
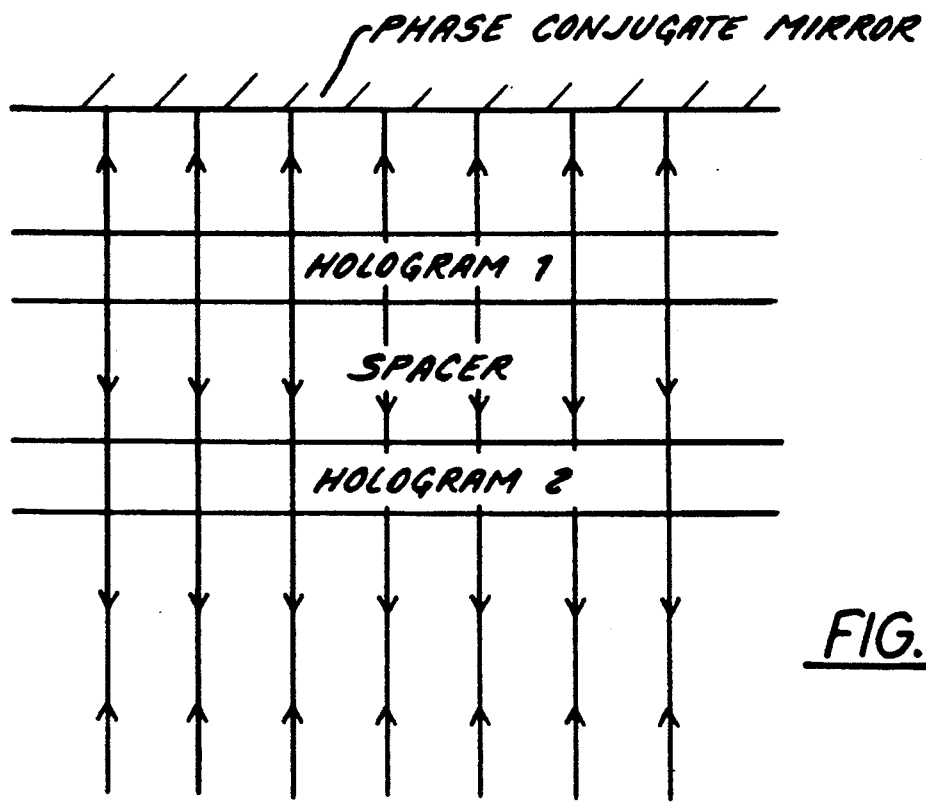
FIG. 23 is a cross-sectional schematic of a preferred recording set up using a phase conjugate mirror.

In order to obtain a good quality reflected wavefront for a Fabry-Perot etalon, it may be preferable to use phase conjugate mirrors for holographic recording as shown in FIG. 23. A phase conjugate mirror operates to reverse the wavefront during reflection. In such a case, the perfectly plane incident wavefront will be exactly reversed. So in spite of wavefront non-uniformity inside the etalon structure, the wavefront remains flat.

Figure 24:
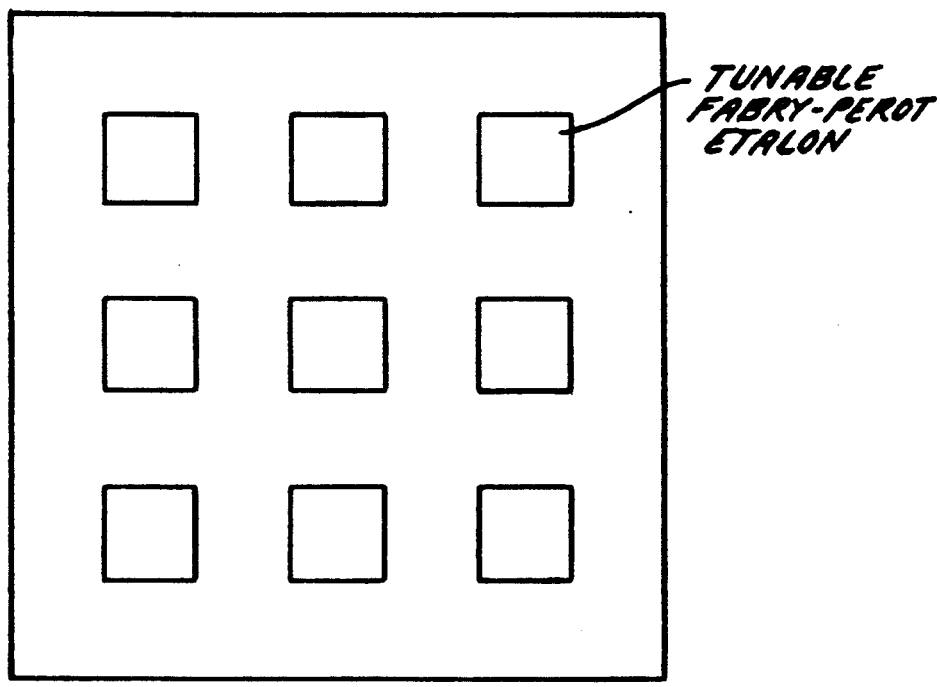
FIG. 24 is a cross-sectional schematic of a spatial light modulator comprising an array of tunable Fabry-Perot etalons of the present invention.

A spatial light modulator (SLM) structure is illustrated in FIG. 24 based on an array of tunable holographic Fabry-Perot etalons of the type shown in FIG. 17. In such a case, each SLM pixel comprises a Fabry-Perot etalon which may be independently driven by a multi-pixel voltage driving electronic system standard in the art. Such a system can be provided by using typical high definition TV large display fabrication procedures.

It is to be understood that embodiments of the present invention not disclosed herein are fully intended to be within the scope of the claims.

We claim:

1. A method of fabricating a high finesse holographic Fabry-Perot etalon comprising the steps of:

providing a first flat having a front surface and an interface surface, the front surface having high optical quality on the order of $\lambda/100$ and the interface surface having moderate optical quality on the order of $\lambda/10$;

providing a second flat having a back surface and an interface surface both surfaces having moderate optical quality on the order of $\lambda/10$;

coating the interface surfaces of the first and second flats;

providing a mirror having high optical quality on the order of $\lambda/100$;

providing a spacer having moderate optical quality surfaces on the order of $\lambda/10$;

joining together the first flat, second flat, spacer, and mirror such that the spacer is sandwiched between the interface surfaces of the first and second flats, with an index matching medium between the spacer and each flat, and such that the back surface of the second flat is joined with the mirror with an index matching layer between the mirror and the second flat;

recording the coatings on the first and second flats using a single step holographic recording process; and, removing the mirror.

2. The invention as defined in claim 1 further characterized in that the coating is a photopolymer.

3. The invention as defined in claim 1 further characterized in that the coating is a dichromated gelatin.

4. The invention as defined in claim 1 wherein the spacer is an electrooptic material.

5. The invention as defined in claim 1 wherein the spacer is air.

6. The invention as defined in claim 1 wherein the spacer is liquid crystal.

7. The invention as defined in claim 1 wherein the spacer is $PbLa(TiZr)O_3$.

8. The invention as defined in claim 1 wherein the spacer is a piezoelectric material.

9. The invention as defined in claim 1 wherein the spacer is a material the refractive index of which is affected by light.

10. A method of fabricating a high finesse holographic Fabry-Perot etalon comprising the steps of:

providing a spacer having two sides, each of moderate surface quality on the order of $\lambda/10$;

coating each side of the spacer with a holographic material;

providing a flat having a front surface and an interface surface, the front surface being of high optical quality on the order of 80/100 and the interface surface being of moderate optical quality on the order of $\lambda/10$;

providing a mirror having high optical quality on the order of $\lambda/100$;

joining the flat, spacer, and mirror such that the spacer is sandwiched between the interface surface of the flat and the mirror, with an index matching medium between the spacer and mirror and between the spacer and interface surface;

recording the holographic material using a one step holographic recording process; and, removing the mirror.

11. The invention as defined in claim 2 further characterized in that the holographic material is a photopolymer.

12. The invention as defined in claim 2 further characterized in that the holographic material is dichromated gelatin.

13. The invention as defined in claim 2 wherein the spacer is an electrooptic material.

14. The invention as defined in claim 10 wherein the spacer is liquid crystal.

15. The invention as defined in claim 10 wherein the spacer is $PbLa(TiZr)O_3$.

16. The invention as defined in claim 10 wherein the spacer is a piezoelectric material.

17. The invention as defined in claim 10 wherein the spacer is a material the refractive index of which is affected by light.

18. A method of fabricating a tunable high finesse holographic Fabry-Perot etalon comprising the steps of:

providing a first flat having a front surface and an interface surface, the front surface having high optical quality on the order of $\lambda/100$ and the interface surface having moderate optical quality on the order of $\lambda/10$;

providing a second flat having a back surface and an interface surface both surfaces having moderate optical quality on the order of $\lambda/10$;

coating the interface surfaces of the first and second flats;

providing a mirror having high optical quality on the order of $\lambda/100$;

providing a spacer having moderate optical quality surfaces on the order of $\lambda/10$, the spacer comprising electrooptic means;

joining together the first flat, second flat, spacer, and mirror such that the spacer is sandwiched between the interface surfaces of the first and second flats, with an index matching medium between the spacer and each flat, and such that the back surface of the second flat is joined with the mirror with an index matching layer between the mirror and the second flat;

recording the coatings on the first and second flats using a single step holographic recording process; and, removing the mirror.

19. A method of fabricating a high finesse holographic Fabry-Perot etalon having slanted fringes comprising the steps of:

providing a flat having a front surface and an interface surface, the front surface having high optical quality on the order of $\lambda/100$ and the interface surface having moderate optical quality on the order of $\lambda/10$;

providing a spacer having two sides, each of moderate optical quality on the order of $\lambda/10$;

coating each side of the spacer with a holographic material to form a coated spacer;

providing a curved mirror having high optical quality on the order of $\lambda/100$;

joining together the flat, coated spacer, and curved mirror such that the spacer is sandwiched between the interface surface of the flat and the mirror, with an index matching medium between the spacer and the flat, and between the spacer and the mirror;

recording the holographic material using a single step holographic recording process.

20. A method of fabricating a curved high finesse holographic Fabry-Perot etalon comprising the steps of:

providing a curved spacer having two sides, each of moderate surface quality on the order of $\lambda/10$;

coating each side of the spacer with a holographic material to form a coated spacer;

providing a flat having a front surface and an interface surface, the front surface being of high optical quality on the order of $\lambda/100$ and the interface surface being of moderate optical quality on the order of $\lambda/10$;

providing a curved mirror having high optical quality on the order of $\lambda/100$;

joining the flat, coated spacer, and mirror such that the coated spacer is sandwiched between the interface surface of the flat and the mirror, with an index matching medium between the coated spacer and mirror and between the coated spacer and interface surface;

recording the holographic material using a one step holographic recording process; and, removing the mirror.

21. A holographic Fabry-Perot etalon which yields high quality reflected wavefronts despite wavefront deformation within the etalon medium, the Fabry-Perot etalon comprising:

a spacer having first and second sides each coated with a holographic material;

a flat having a front surface and an interface surface, the interface surface of the flat being adjacent the holographic material on the first side;

a phase conjugate mirror adjacent the holographic material of the second side.

22. A spatial light modulator comprising:

a plurality of tunable Fabry-Perot etalons arranged in an array;

each of the etalons comprising a first flat having coated thereon a first holographic material;

a metal electrode mounted on the holographic material;

an electrooptic material mounted on the metal electrode;

a second metal electrode mounted on the electrooptic material;

a second flat one side of which is coated with a second holographic material and the second holographic material mounted to the second metal electrode; and multi-pixel voltage driving means for driving each tunable Fabry-Perot etalon independently of the other etalons.

* * * * *